United States Patent
Paczkowski et al.

(10) Patent No.: US 10,790,965 B1
(45) Date of Patent: *Sep. 29, 2020

(54) TIERED DISTRIBUTED LEDGER TECHNOLOGY (DLT) IN A NETWORK FUNCTION VIRTUALIZATION (NFV) CORE NETWORK

(71) Applicant: Sprint Communications Company L.P., Overland Park, KS (US)

(72) Inventors: Lyle W. Paczkowski, Mission Hills, KS (US); Lyle T. Bertz, Lee's Summit, MO (US); Mark R. Bales, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,612

(22) Filed: May 20, 2019

Related U.S. Application Data

(63) Continuation of application No. 15/686,312, filed on Aug. 25, 2017, now Pat. No. 10,348,488.

(51) Int. Cl.
*H04L 29/06* (2006.01)
*H04L 29/08* (2006.01)
(Continued)

(52) U.S. Cl.
CPC .......... *H04L 9/0637* (2013.01); *H04L 9/0643* (2013.01); *H04L 41/5054* (2013.01);
(Continued)

(58) Field of Classification Search
CPC . H04L 9/0637; H04L 9/0643; H04L 41/5054; H04L 45/56; H04L 45/64;
(Continued)

(56) References Cited

U.S. PATENT DOCUMENTS

| 5,928,363 A | 7/1999 | Ruvolo |
| 5,983,350 A | 11/1999 | Minear et al. |

(Continued)

FOREIGN PATENT DOCUMENTS

| WO | 2015039699 A1 | 3/2015 |
| WO | 2016102297 A1 | 6/2016 |
| WO | 2017062101 A1 | 4/2017 |

OTHER PUBLICATIONS

Notice of Allowance dated Sep. 17, 2019, U.S. Appl. No. 14/872,936, filed Oct. 1, 2015.

(Continued)

*Primary Examiner* — Mohammad A Siddiqi

(57) ABSTRACT

A method of combining chains of blocks in a network. The method comprising, creating a plurality of birth blocks of a plurality of chains of blocks by a block foundry application in a network, where each birth block is associated with a chain of blocks that records events of a network entity, creating blocks by a plurality of nodes in the network, wherein the current block and the previous block are linked, terminating the chain of blocks by the network entity, wherein the entity sends a termination request to create an end block, creating the end block, wherein the end block is the final block of the chain of blocks, and in response to the creation of the end block, sending a request by the network entity to create a block of a meta-chain of blocks, and creating the block of the meta-chain of blocks by the plurality of nodes.

18 Claims, 11 Drawing Sheets

(51) Int. Cl.
*H04L 9/06* (2006.01)
*H04L 12/24* (2006.01)
*H04W 12/08* (2009.01)
*H04L 12/771* (2013.01)
*H04W 4/021* (2018.01)
*H04L 12/715* (2013.01)
*G07C 13/00* (2006.01)

(52) U.S. Cl.
CPC .............. *H04L 45/56* (2013.01); *H04L 45/64* (2013.01); *H04L 63/10* (2013.01); *H04L 63/107* (2013.01); *H04L 67/18* (2013.01); *H04W 4/021* (2013.01); *H04W 12/08* (2013.01); *G07C 13/00* (2013.01)

(58) Field of Classification Search
CPC ....... H04L 63/10; H04L 63/107; H04L 67/18; H04W 4/021; H04W 12/08
See application file for complete search history.

(56) References Cited

U.S. PATENT DOCUMENTS

| | | |
|---|---|---|
| 6,775,772 B1 | 8/2004 | Binding et al. |
| 7,305,712 B2 | 12/2007 | Watt et al. |
| 7,325,083 B2 | 1/2008 | Watt et al. |
| 7,340,573 B2 | 3/2008 | Watt |
| 7,370,210 B2 | 5/2008 | Symes |
| 7,661,104 B2 | 2/2010 | Watt et al. |
| 7,702,951 B2 | 4/2010 | Yamamoto et al. |
| 7,849,296 B2 | 12/2010 | Watt et al. |
| 8,005,000 B1 | 8/2011 | Srinivasan |
| 8,090,797 B2 | 1/2012 | Chinta et al. |
| 8,171,483 B2 | 5/2012 | Nord et al. |
| 8,271,976 B2 | 9/2012 | Vega et al. |
| 8,280,944 B2 | 10/2012 | Laadan et al. |
| 8,443,230 B1 | 5/2013 | James-Roxby et al. |
| 8,649,770 B1 | 2/2014 | Cope et al. |
| 8,712,407 B1 | 4/2014 | Cope et al. |
| 8,797,875 B2 | 8/2014 | Garcia et al. |
| 8,842,578 B1 | 9/2014 | Zisapel et al. |
| 8,863,252 B1 | 10/2014 | Katzer et al. |
| 8,918,860 B1 | 12/2014 | Enderwick |
| 8,935,318 B1 | 1/2015 | Konerding et al. |
| 8,984,110 B1 | 3/2015 | Asveren |
| 8,996,644 B2 | 3/2015 | Pope |
| 9,047,441 B2 | 6/2015 | Xie et al. |
| 9,077,709 B1 | 7/2015 | Dall et al. |
| 9,104,836 B2 | 8/2015 | Burstein et al. |
| 9,118,655 B1 | 8/2015 | Paczkowski et al. |
| 9,161,227 B1 | 10/2015 | Bye et al. |
| 9,183,606 B1 | 11/2015 | Paczkowski et al. |
| 9,191,865 B1 | 11/2015 | Paczkowski et al. |
| 9,203,842 B2 | 12/2015 | Venkataramu et al. |
| 9,230,085 B1 | 1/2016 | Paczkowski et al. |
| 9,237,084 B2 | 1/2016 | Chapman |
| 9,251,384 B1 | 2/2016 | Potlapally et al. |
| 9,274,974 B1 | 3/2016 | Chen et al. |
| 9,282,898 B2 | 3/2016 | McRoberts et al. |
| 9,288,148 B1 | 3/2016 | Krishnaswamy et al. |
| 9,298,515 B2 | 3/2016 | McMurry et al. |
| 9,317,689 B2 | 4/2016 | Aissi |
| 9,319,220 B2 | 4/2016 | Grewal et al. |
| 9,324,016 B1 | 4/2016 | Cordes et al. |
| 9,374,363 B1 | 6/2016 | Paczkowski et al. |
| 9,384,028 B1 | 7/2016 | Felstaine et al. |
| 9,392,446 B1 | 7/2016 | Paczkowski et al. |
| 9,396,016 B1 | 7/2016 | Marquardt et al. |
| 9,407,612 B2 | 8/2016 | Sood et al. |
| 9,413,634 B2 | 8/2016 | Nadeau et al. |
| 9,444,886 B2 | 9/2016 | Rahman et al. |
| 9,450,866 B2 | 9/2016 | He et al. |
| 9,460,286 B1 | 10/2016 | Felstaine et al. |
| 9,462,084 B2 | 10/2016 | Connor et al. |
| 9,503,344 B2 | 11/2016 | Chakrabarti et al. |
| 9,503,363 B2 | 11/2016 | Sivabalan et al. |
| 9,509,587 B1 | 11/2016 | Marquardt et al. |
| 9,519,563 B2 | 12/2016 | Manghirmalani et al. |
| 9,537,741 B2 | 1/2017 | Chakrabarti et al. |
| 9,549,321 B2 | 1/2017 | Slavov et al. |
| 9,560,078 B2 | 1/2017 | Sood et al. |
| 9,565,168 B1 | 2/2017 | Marquardt et al. |
| 9,578,008 B2 | 2/2017 | Sood et al. |
| 9,578,664 B1 | 2/2017 | Paczkowski et al. |
| 9,613,190 B2 | 4/2017 | Ford et al. |
| 9,628,445 B2 | 4/2017 | Antonakakis |
| 9,648,044 B2 | 5/2017 | Islam et al. |
| 9,667,665 B1 | 5/2017 | Paczkowski et al. |
| 9,686,237 B2 | 6/2017 | DeCusatis et al. |
| 9,686,240 B1 | 6/2017 | Ray et al. |
| 9,692,743 B2 | 6/2017 | Islam et al. |
| 9,729,515 B1 | 8/2017 | Anantharaju |
| 9,742,790 B2 | 8/2017 | Sood et al. |
| 9,749,294 B1 | 8/2017 | Marquardt et al. |
| 9,769,854 B1 | 9/2017 | Paczkowski et al. |
| 9,781,016 B1 | 10/2017 | Marquardt et al. |
| 9,811,686 B1 | 11/2017 | Marquardt et al. |
| 9,819,661 B2 | 11/2017 | Stern |
| 9,871,768 B1 | 1/2018 | Ray et al. |
| 9,979,699 B1 | 5/2018 | Marquardt et al. |
| 10,044,572 B1 | 8/2018 | Marquardt et al. |
| 10,250,498 B1 | 4/2019 | Bales et al. |
| 10,348,488 B1 * | 7/2019 | Paczkowski ............ H04L 45/56 |
| 10,536,373 B1 | 1/2020 | Bales et al. |
| 10,542,115 B1 | 1/2020 | Marquardt et al. |
| 2002/0091650 A1 | 7/2002 | Ellis |
| 2002/0107958 A1 | 8/2002 | Faraldo |
| 2003/0177387 A1 | 9/2003 | Osterwalder et al. |
| 2004/0139352 A1 | 7/2004 | Shewchuk et al. |
| 2004/0177269 A1 | 9/2004 | Belnet et al. |
| 2004/0181682 A1 | 9/2004 | Orino et al. |
| 2004/0187117 A1 | 9/2004 | Orion et al. |
| 2004/0221163 A1 | 11/2004 | Jorgensen et al. |
| 2004/0240468 A1 | 12/2004 | Chin et al. |
| 2004/0260910 A1 | 12/2004 | Watt et al. |
| 2005/0068981 A1 | 3/2005 | Park et al. |
| 2005/0102603 A1 | 5/2005 | Tapper et al. |
| 2005/0114616 A1 | 5/2005 | Tune et al. |
| 2005/0124382 A1 | 6/2005 | Britt et al. |
| 2005/0138421 A1 | 6/2005 | Fedronic et al. |
| 2005/0160210 A1 | 7/2005 | Watt et al. |
| 2005/0185672 A1 | 8/2005 | Endo et al. |
| 2005/0261985 A1 | 11/2005 | Miller et al. |
| 2006/0146767 A1 | 7/2006 | Moganti |
| 2006/0190614 A1 | 8/2006 | Altman et al. |
| 2006/0253701 A1 | 11/2006 | Kim et al. |
| 2006/0259641 A1 | 11/2006 | Kim et al. |
| 2007/0174253 A1 | 7/2007 | Hodnett et al. |
| 2007/0282572 A1 | 12/2007 | Larus |
| 2008/0020745 A1 | 1/2008 | Bae et al. |
| 2008/0049640 A1 | 2/2008 | Heinz et al. |
| 2008/0162877 A1 | 7/2008 | Altman et al. |
| 2008/0165259 A1 | 7/2008 | Nobels |
| 2008/0189468 A1 | 8/2008 | Schmidt et al. |
| 2008/0301779 A1 | 12/2008 | Garg et al. |
| 2009/0007100 A1 | 1/2009 | Field et al. |
| 2009/0199177 A1 | 8/2009 | Edwards et al. |
| 2009/0210526 A1 | 8/2009 | Howell et al. |
| 2009/0241108 A1 | 9/2009 | Edwards et al. |
| 2009/0254984 A1 | 10/2009 | Nice et al. |
| 2009/0300605 A1 | 12/2009 | Edwards et al. |
| 2009/0320048 A1 | 12/2009 | Watt et al. |
| 2010/0103837 A1 | 4/2010 | Jungck et al. |
| 2010/0106568 A1 | 4/2010 | Grimes |
| 2010/0192230 A1 | 7/2010 | Steeves et al. |
| 2010/0306361 A1 | 12/2010 | Boberg et al. |
| 2011/0119748 A1 | 5/2011 | Edwards et al. |
| 2011/0173443 A1 | 7/2011 | Osterwalder et al. |
| 2012/0040662 A1 | 2/2012 | Rahman et al. |
| 2012/0117379 A1 | 5/2012 | Thornewell et al. |
| 2012/0304244 A1 | 11/2012 | Xie et al. |
| 2012/0331550 A1 | 12/2012 | Raj et al. |
| 2013/0055256 A1 | 2/2013 | Banga et al. |
| 2013/0070745 A1 | 3/2013 | Nixon et al. |

(56) References Cited

U.S. PATENT DOCUMENTS

| | | |
|---|---|---|
| 2013/0091568 A1 | 4/2013 | Sharif et al. |
| 2013/0160139 A1 | 6/2013 | Goel et al. |
| 2013/0219010 A1 | 8/2013 | Mahendran et al. |
| 2013/0290563 A1 | 10/2013 | Fleischman et al. |
| 2013/0305333 A1 | 11/2013 | Katzer et al. |
| 2013/0333008 A1 | 12/2013 | Tapling et al. |
| 2013/0345530 A1 | 12/2013 | McRoberts et al. |
| 2014/0013327 A1 | 1/2014 | Sherwood et al. |
| 2014/0033316 A1 | 1/2014 | Paczkowski et al. |
| 2014/0047548 A1 | 2/2014 | Bye et al. |
| 2014/0052922 A1 | 2/2014 | Moyer et al. |
| 2014/0053003 A1 | 2/2014 | Moyer et al. |
| 2014/0075567 A1 | 3/2014 | Raleigh et al. |
| 2014/0092753 A1 | 4/2014 | Vasseur et al. |
| 2014/0201374 A1 | 7/2014 | Ashwood-Smith et al. |
| 2014/0229945 A1 | 8/2014 | Barkai et al. |
| 2014/0241247 A1 | 8/2014 | Kempf et al. |
| 2014/0259115 A1 | 9/2014 | Bakshi et al. |
| 2014/0281529 A1 | 9/2014 | Epp et al. |
| 2014/0281544 A1 | 9/2014 | Paczkowski et al. |
| 2014/0289826 A1 | 9/2014 | Croome |
| 2014/0298477 A1 | 10/2014 | Castro et al. |
| 2014/0304803 A1 | 10/2014 | Pope et al. |
| 2014/0325681 A1 | 10/2014 | Kleidermacher et al. |
| 2014/0331297 A1 | 11/2014 | Innes et al. |
| 2014/0337940 A1 | 11/2014 | Slavov et al. |
| 2014/0344912 A1 | 11/2014 | Chapman et al. |
| 2014/0373012 A1 | 12/2014 | Ylitalo et al. |
| 2015/0046676 A1 | 2/2015 | Archibald et al. |
| 2015/0072726 A1 | 3/2015 | Stern |
| 2015/0074745 A1 | 3/2015 | Stern et al. |
| 2015/0074764 A1 | 3/2015 | Stern |
| 2015/0089246 A1 | 3/2015 | Kanai et al. |
| 2015/0117409 A1 | 4/2015 | Ghai |
| 2015/0117455 A1 | 4/2015 | Umesh et al. |
| 2015/0169885 A1 | 6/2015 | Paczkowski et al. |
| 2015/0172928 A1 | 6/2015 | Katzer et al. |
| 2015/0180730 A1 | 6/2015 | Felstaine et al. |
| 2015/0195149 A1 | 7/2015 | Vasseur et al. |
| 2015/0195281 A1 | 7/2015 | Venkataramu et al. |
| 2015/0215308 A1 | 7/2015 | Manolov et al. |
| 2015/0220937 A1 | 8/2015 | Iannace et al. |
| 2015/0237035 A1 | 8/2015 | Islam et al. |
| 2015/0244717 A1 | 8/2015 | Jin et al. |
| 2015/0248283 A1 | 9/2015 | Gschwind et al. |
| 2015/0248554 A1 | 9/2015 | Dumitru et al. |
| 2015/0358248 A1 | 12/2015 | Saha et al. |
| 2015/0365352 A1 | 12/2015 | Xiang |
| 2015/0370704 A1 | 12/2015 | Kato |
| 2015/0373050 A1 | 12/2015 | Dayan et al. |
| 2015/0381423 A1 | 12/2015 | Xiang |
| 2016/0004876 A1 | 1/2016 | Bye et al. |
| 2016/0007190 A1 | 1/2016 | Wane |
| 2016/0043944 A1 | 2/2016 | Felstaine et al. |
| 2016/0057102 A1 | 2/2016 | Wei et al. |
| 2016/0057171 A1 | 2/2016 | DeCusatis et al. |
| 2016/0057788 A1 | 2/2016 | Sharma et al. |
| 2016/0073283 A1 | 3/2016 | Grayson et al. |
| 2016/0080323 A1 | 3/2016 | MacKay et al. |
| 2016/0086172 A1 | 3/2016 | Kamal et al. |
| 2016/0094573 A1 | 3/2016 | Sood et al. |
| 2016/0119141 A1 | 4/2016 | Jing et al. |
| 2016/0119374 A1 | 4/2016 | Williams et al. |
| 2016/0127323 A1 | 5/2016 | Antonakakis |
| 2016/0127333 A1 | 5/2016 | Sood et al. |
| 2016/0142396 A1 | 5/2016 | McRoberts et al. |
| 2016/0149748 A1 | 5/2016 | Pan |
| 2016/0149921 A1 | 5/2016 | Potlapally et al. |
| 2016/0157084 A1 | 6/2016 | Tsubouchi |
| 2016/0170848 A1 | 6/2016 | Yang et al. |
| 2016/0180089 A1 | 6/2016 | Dalcher |
| 2016/0182499 A1 | 6/2016 | Sharaga et al. |
| 2016/0182567 A1 | 6/2016 | Sood et al. |
| 2016/0205004 A1 | 7/2016 | Chou et al. |
| 2016/0212016 A1 | 7/2016 | Vrzic et al. |
| 2016/0212620 A1 | 7/2016 | Paczkowski et al. |
| 2016/0219076 A1 | 7/2016 | Paczkowski et al. |
| 2016/0226663 A1 | 8/2016 | Jones et al. |
| 2016/0226907 A1 | 8/2016 | Weiss et al. |
| 2016/0226912 A1 | 8/2016 | Clark et al. |
| 2016/0226913 A1 | 8/2016 | Sood et al. |
| 2016/0234725 A1 | 8/2016 | Paczkowski et al. |
| 2016/0253664 A1 | 9/2016 | Yuan et al. |
| 2016/0323200 A1 | 11/2016 | Xiang et al. |
| 2016/0337329 A1 | 11/2016 | Sood et al. |
| 2016/0344560 A1 | 11/2016 | Caceres et al. |
| 2016/0350150 A1 | 12/2016 | Marquardt et al. |
| 2016/0352537 A1 | 12/2016 | Marquardt et al. |
| 2016/0366105 A1 | 12/2016 | Smith et al. |
| 2016/0366123 A1 | 12/2016 | Smith et al. |
| 2016/0373474 A1 | 12/2016 | Sood et al. |
| 2016/0378685 A1 | 12/2016 | Spurlock et al. |
| 2016/0379003 A1 | 12/2016 | Kapoor et al. |
| 2017/0005990 A1 | 1/2017 | Birger et al. |
| 2017/0012968 A1 | 1/2017 | Feng et al. |
| 2017/0012975 A1 | 1/2017 | Ilyadis et al. |
| 2017/0034284 A1 | 2/2017 | Smith et al. |
| 2017/0068817 A1 | 3/2017 | Ali et al. |
| 2017/0093806 A1 | 3/2017 | Phegade et al. |
| 2017/0102957 A1 | 4/2017 | Marquardt et al. |
| 2017/0126413 A1 | 5/2017 | Grobman et al. |
| 2017/0142024 A1 | 5/2017 | Fromentoux et al. |
| 2017/0142163 A1 | 5/2017 | Sood et al. |
| 2017/0149798 A1 | 5/2017 | Antonakakis |
| 2017/0161501 A1 | 6/2017 | Sood et al. |
| 2017/0187723 A1 | 6/2017 | Islam et al. |
| 2017/0208038 A1 | 7/2017 | Hinaman et al. |
| 2017/0214694 A1 | 7/2017 | Yan |
| 2017/0230428 A1 | 8/2017 | Paczkowski et al. |
| 2017/0308872 A1 | 10/2017 | Uhr et al. |
| 2017/0310647 A1 | 10/2017 | Hu et al. |
| 2017/0347308 A1 | 11/2017 | Chou et al. |
| 2018/0082390 A1 | 3/2018 | Leidner et al. |
| 2018/0101844 A1* | 4/2018 | Song ............... H04L 9/0643 |
| 2018/0191503 A1* | 7/2018 | Alwar ............... H04L 9/14 |
| 2018/0218342 A1 | 8/2018 | Lim et al. |
| 2019/0019188 A1 | 1/2019 | Leidner et al. |
| 2019/0079950 A1* | 3/2019 | Ramabaja ........... H04L 63/123 |

OTHER PUBLICATIONS

Notice of Allowance dated Sep. 10, 2019, U.S. Appl. No. 16/246,311, filed Feb. 14, 2019.

Marquardt, Ronald R., et al., "Securing Communication in a Network Function Virtualization (NFV) Core Network," filed Nov. 27, 2019, U.S. Appl. No. 16/698,639.

Notice of Allowance dated Oct. 5, 2016, U.S. Appl. No. 14/746,615, filed Jun. 22, 2015.

Notice of Allowance dated May 12, 2017, U.S. Appl. No. 15/403,166, filed Jan. 10, 2017.

FAIPP Pre-Interview Communication dated Jul. 25, 2016, U.S. Appl. No. 14/703,885, filed May 5, 2015.

Notice of Allowance dated Sep. 20, 2016, U.S. Appl. No. 14/703,885, filed May 5, 2015.

FAIPP Pre-Interview Communication dated Feb. 7, 2017, U.S. Appl. No. 14/847,992, filed Sep. 8, 2015.

Notice of Allowance dated Apr. 25, 2017, U.S. Appl. No. 14/847,992, filed Sep. 8, 2015.

FAIPP Pre-Interview Communication dated Dec. 15, 2017, U.S. Appl. No. 15/655,080, filed Jul. 20, 2017.

Notice of Allowance dated Jan. 30, 2018, U.S. Appl. No. 15/655,080, filed Jul. 20, 2017.

FAIPP Pre-Interview Communication dated Mar. 9, 2017, U.S. Appl. No. 14/930,146, filed Nov. 2, 2015.

Notice of Allowance dated May 26, 2017, U.S. Appl. No. 14/930,146, filed Nov. 2, 2015.

FAIPP Pre-Interview Communication dated Jan. 12, 2018, U.S. Appl. No. 15/686,324, filed Aug. 25, 2017.

Notice of Allowance dated Apr. 16, 2018, U.S. Appl. No. 15/686,324, filed Aug. 25, 2017.

(56) References Cited

OTHER PUBLICATIONS

FAIPP Pre-Interview Communication dated Apr. 20, 2017, U.S. Appl. No. 14/879,324, filed Oct. 9, 2015.
Notice of Allowance dated Jul. 3, 2017, U.S. Appl. No. 14/879,324, filed Oct. 9, 2015.
FAIPP Pre-Interview Communication dated Oct. 19, 2017, U.S. Appl. No. 14/872,936, filed Oct. 1, 2015.
Final Office Action dated Apr. 17, 2018, U.S. Appl. No. 14/872,936, filed Oct. 1, 2015.
Office Action dated Oct. 30, 2018, U.S. Appl. No. 14/872,936, filed Oct. 1, 2015.
Final Office Action dated Apr. 19, 2019, U.S. Appl. No. 14/872,936, filed Oct. 1, 2015.
Office Action dated Jul. 24, 2017, U.S. Appl. No. 14/879,327, filed Oct. 9, 2015.
Final Office Action dated Feb. 7, 2018, U.S. Appl. No. 14/879,327, filed Oct. 9, 2015.
Notice of Allowance dated Nov. 21, 2016, U.S. Appl. No. 14/793,344, filed Jul. 7, 2015.
Notice of Allowance dated Sep. 11, 2017, U.S. Appl. No. 15/602,057, filed May 22, 2017.
FAIPP Pre-Interview Communication dated Oct. 9, 2018, U.S. Appl. No. 15/284,506, filed Oct. 3, 2016.
Notice of Allowance dated Nov. 28, 2018, U.S. Appl. No. 15/284,506, filed Oct. 3, 2016.
FAIPP Pre-Interview Communication dated Aug. 8, 2019, U.S. Appl. No. 16/246,311, filed Feb. 14, 2019.
Notice of Allowance dated Mar. 11, 2019, U.S. Appl. No. 15/686,312, filed Aug. 8, 2017.
Network Functions Virtualisation, "An Introduction, Benefits, Enablers, Challenges Call for Action," Oct. 22-24, 2012, "SDN an OpenFlow World Congress," Darmstadt-Germany.
Network Functions Virtualisation, "Network Operator Perspectives on Industry Progress," Oct. 14-17, 2012, "SDN an OpenFlow World Congress," Darmstadt-Germany.
Foreign Communication from a Related Counterpart—International Search Report and Written Opinion dated Oct. 21, 2016, filed on Aug. 11, 2016, International Application No. PCT/US2016/046648.
Foreign Communication from a Related Counterpart , Preliminary Report on Patentability, dated Apr. 19, 2018, Application No. PCT/US2016/046648, filed on Aug. 11, 2016.
Hwang, Jinho, et al., entitled, "NetVM: High Performance and Flexible Networking Using Virtualization on Commodity Platforms," 11th USENIX Symposium on Networked Systems Design and Implementation (NSDI 14); Apr. 2-5, 2014, Seattle WA, US, ISBN 978-1-931971-09-06.
Mahy, et al., entitled, "Traversal Using Relays around NAT (TURN): Relay Extensions to Session Traversal Utilities for NAT (STUN)," Apr. 2010, Internet Engineering Task Force (IETF), Request for Comments: 5766. (Year: 2010).
Marquardt, Ronald R., et al., "Securing Communication in a Network Function Virtualization (NFV) Core Network," filed Oct. 1, 2015, U.S. Appl. No. 14/872,936.
Bales, Mark R., et al., "Session Aggregator Brokering of Data Stream Communication," filed Feb. 14, 2019, U.S. Appl. No. 161/276,311.

\* cited by examiner

TIERED DISTRIBUTED LEDGER TECHNOLOGY (DLT) IN A NETWORK FUNCTION VIRTUALIZATION (NFV) CORE NETWORK

CROSS-REFERENCE TO RELATED APPLICATIONS

This application is a continuation application to U.S. patent application Ser. No. 15/686,312, filed Aug. 25, 2017 and entitled "Tired Distributed Ledger Technology (DLT) in a Network Function Virtualization (NFV) Core Network," which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic communications may carry a wide variety of content, for example electronic mail, medical records, financial transactions, and other confidential information. A wireless communication network may store this information in databases on the network. These databases may expend a significant amount of network resources, in turn placing a strain on the network infrastructure. The confidential information may also be at risk to be fraudulently modified or tampered with by a third party.

SUMMARY

In an embodiment, a method of combining chains of blocks in a network is described. The method comprises creating a plurality of birth blocks of a plurality of chains of blocks by a block foundry application in a network, where each birth block is associated with a chain of blocks that records events of a network entity and comprises a nonce value, a hash value, and a transaction and for each chain of blocks, creating blocks by a plurality of nodes in the network, where each block comprises a nonce value, a transaction, a hash value, and the hash value of the previous block, wherein the hash value of the previous block links the current block and the previous block, terminating the chain of blocks by the network entity, wherein the entity sends a termination request to create an end block to the plurality of nodes, and creating the end block based on the termination request by the plurality of nodes, wherein the end block is the final block of the chain of blocks, the end block comprising a final nonce value, a final transaction, a final hash value, and the hash value of the previous block, wherein the hash value of the previous block links the end block and previous block. The method further comprises, in response to the creation of the end block, sending a request by the network entity to the plurality of nodes to create a block of a meta-chain of blocks and creating based on the block request the block of the meta-chain of blocks by the plurality of nodes, wherein the block comprises a nonce value, a transaction, a hash value, the hash value of the previous block of the meta-chain of blocks, and the hash value of the end block of the chain of blocks. In yet another embodiment, a network system is described. The network system comprises a block foundry server, a plurality of network entities, and a plurality of nodes in a network, comprising a non-transitory memory. The system further comprises a plurality of chains of blocks stored in the non-transitory memory, wherein each chain of blocks comprises a birth block, a plurality of blocks, and an end block, each block comprising a block number, a nonce value, a transaction, a hash value, and the hash value of the previous block, wherein the hash value of the previous block links the block and the previous block and a meta-chain of blocks stored in the non-transitory memory, wherein the meta-chain of blocks comprises at least one block that comprises a block number, a nonce value, a transaction, a hash value, a hash value of the previous block of the meta-chain of blocks, and a hash value of an end block of a chain of blocks.

In yet another embodiment, a method of tracking, monitoring, and preserving temporal network function virtualization (NFV) events on a distributed ledger technology (DLT) computer system is described. The method comprises, initiating by a hypervisor executing on a computer system a plurality of virtual servers providing a plurality of virtualized network functions (VNFs) that comprises a tracking application on a network function virtualization (NFV) core network, and for each virtual server, sending a request to create a birth block based on the initiation of the virtual server by the tracking application to a block foundry application in the network, creating based on the block request by the block foundry application, the birth block of a chain of blocks comprising a first nonce value, a first transaction, and a first hash value, and detecting a plurality of changes of state of the virtual server by the tracking application. The method further comprises for each change of state of the virtual server, sending a request to create a new block based on the change of state of the virtual server by the hypervisor to a plurality of nodes in the network and creating based on the new block request by the plurality of nodes, a new block of the chain of blocks, wherein the new block follows the previous block, comprising a new nonce value, a new transaction, a new hash value, and the hash value of the previous block, wherein the hash value of the previous block links the new block and the previous block. The method further comprises terminating the virtual server on the NFV core network by the hypervisor, sending a termination request to create an end block based on the termination of the virtual server by the hypervisor to the plurality of nodes in the network, creating based on the termination block request by the plurality of nodes, an end block of the chain of blocks, wherein the end block is the final block of the chain of blocks, the end block comprising a final nonce value, a final transaction, a final hash value, and the hash value of the previous block, wherein the hash value of the previous block links the end block and the previous block, sending a request by the hypervisor to the plurality of nodes to create a block of a meta-chain of blocks, wherein the meta-chain of blocks tracks related chains of blocks in the NFV core network, and creating by the plurality of nodes the block of the meta-chain of blocks, wherein the block comprises a nonce value, a transaction, a hash value, the hash value of the previous block of the meta-chain of blocks, and the hash value of the end block of the chain of blocks.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
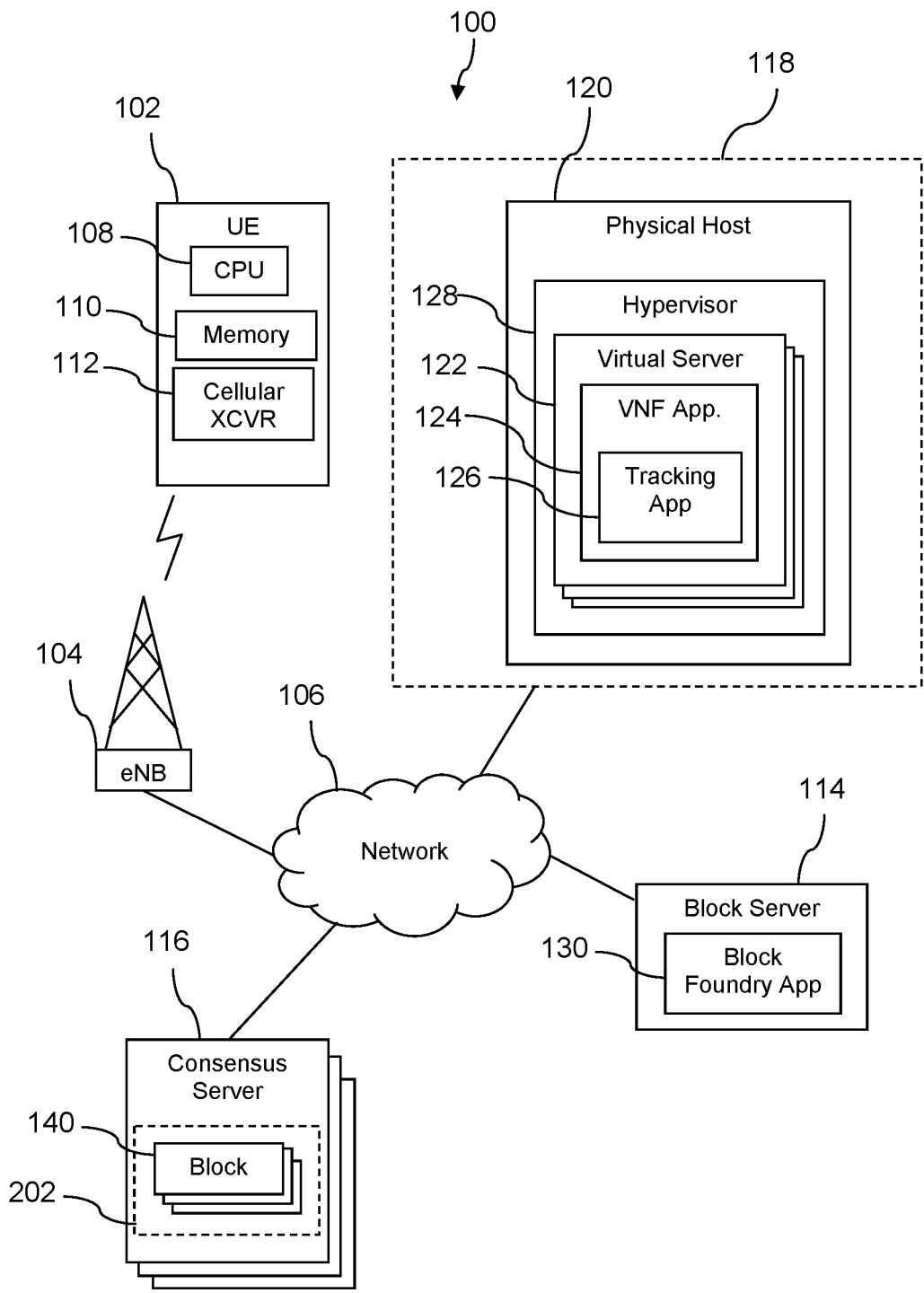
- FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Network function virtualization (NFV) systems may be implemented by communication service providers to increase efficiency and improve service flexibility. Virtualized network functions (VNF) may reduce the service providers' hardware dependencies and allow for more scalable distribution of virtual resources, which may reduce capital and operational expenditures. However, tracking usage for these virtual resources may be difficult since they do not have persistent physical identities. Logging the usage of the virtual machines and storing the logs in data stores distributed on the network may place a strain on network infrastructure and use up valuable network resources. Additionally, these logs may be modified or corrupted by fraudulent revisions by parties on the network. The unauthorized alterations of the logs may lead to inaccurate information across the network, and the service provider may erroneously bill a user. This may cause a loss of confidence amongst parties in the network without an efficient method to verify the usage logs. In an embodiment, a service provider may want to monitor NFV events in order to determine when and where to increase or decrease hardware assets for NFV support in a timely manner. For example, the service provider may decide to expand hardware assets when 80% of virtual resources of a VNF are used.

The present disclosure teaches several related methods for tracking, monitoring, and preserving network function virtualization (NFV) events based on a distributed ledger technology (DLT) computer system. Distributed ledger technology (DLT) utilizes a distributed database without a central administrator managed on a peer-to-peer (P2P) network in order to maintain records in a secure manner by a consensus mechanism amongst nodes in the network to prevent modification of the records. The distributed database may be spread across multiple sites, regions, and/or parties. DLT may be used to validate and authenticate data exchanges. Records may be stored in the network once a majority of the nodes in the network achieve consensus. Distributed ledger technology may be applied in many aspects that involve secure data storage. For example, distributed ledgers may be used to record contracts (e.g., financial contracts, smart contracts), financial transactions, and other tangible and intangible goods.

In some forms of DLT, blocks are used to store information and then connected in a chronological technique. These blocks are inherently resistant to modification of the data. One skilled in the art understands the process of how DLT is used to securely store records, but a basic description is provided here. The first block may be created by a block foundry in the network through an algorithm. A request for a new block to be created may be sent to a plurality of nodes in the network. A block typically comprises a block number, a nonce value, a timestamp, a plurality of transactions, a hash value, and the hash value of the previous block, which links the block with the previous block. A hash is a string of data with a given size (e.g., 64-bits, 128-bits, 256-bits) that is based on the information in the block (e.g., the block number, the nonce value, the transactions, and the previous hash). The nonce value is varied by the nodes in the network in order to solve the hash value based on a hashing algorithm. No meaningful data can be derived from the hash of the block. In other words, the transaction data cannot be back-solved based on the hash. The nodes in the network collectively validate new blocks when a request is sent, and once a block is validated, it cannot be retroactively altered without invalidating the subsequent blocks. Typically, blocks are validated on a majority rule (e.g., 50%+1 vote) in the network, wherein the majority of nodes in the network are in consensus, or agreement. Each block comprises the hash and the hash of the previous block, which links the two blocks.

In an embodiment, some of a communication network's functionality may be provided with a network function virtualization (NFV) communication paradigm. Network node functions, for example, the functionality of a home subscriber server, a mobility management entity, a policy and charging rules function node, and a serving gateway—rather than each being provided by separate computers or computer systems—may be provided by virtual servers executing in a virtual computing environment, for example executing in a cloud computing environment. The network functions may be composed of common functions. In an embodiment, common functions are executed in one or more virtual servers executing in a virtual computing environment.

The factorization of common functions in combination with virtualized execution can provide a variety of advantages to a wireless communication service provider. This paradigm provides the ability to conveniently and quickly expand or contract compute resources as needed. This paradigm allows a wireless communication service provider to pay for compute resources as they are used, on an as needed basis, versus investing significant capital in purchasing and installing computing equipment in anticipation of future needs, needs which may not materialize or may not be as large (or as small!) as projected. Virtualization of common network functions and network function virtualization is described further hereinafter.

A virtual computing environment may support ease of maintenance, ease of upgrading, ease of expansion and contraction of computer resources. The virtual computing environment may be a private cloud computing environment owned, operated, and managed by a wireless communication service provider. Alternatively, the virtual computing environment may be a public cloud computing deployment owned, operated, and managed by a cloud computing service provider and supporting not only the core network functionality of a wireless communication service provider but also supporting computing needs of web-based enterprises, larger on-line retail sales enterprises, governmental entities, and the like.

Virtual servers execute on compute resources. The physical details of the compute resources may be abstracted so a virtual server only interacts with a logical view of the underlying compute resources, thereby decoupling the virtual servers from the physical details of the compute resources. Decoupling the virtual servers from the physical details of the underlying compute resources may make instantiating the virtual server on different physical compute resources more convenient and may entail less system administrator intervention. A virtual server may execute in the context of or under the management of a hypervisor or may execute in the context of a logical operating system that abstracts away the details of the underlying compute resources. Compute resources comprising the customary computer system components: processor, main memory, secondary memory or mass memory, and network interfaces. Services rendered in the NFV core network may be monitored and billed. Additional virtual servers may be dynamically started to execute additional instances of a common function and stopped as needed to handle dynamically changing communication loads in the NFV core network. There may be tens of thousands of virtual machines running on a network at a given time.

A distributed ledger used to record changes of state of a virtual server in a network function virtualization (NFV) core network is taught herein. When a virtual server providing a virtualized network function (VNF) is initiated on the network, a request to create a first block may be sent to a block foundry application in the network. The virtual server may comprise a tracking application that monitors the state of the virtual server. The tracking application may be configured to send a request to create a block upon initiation of a virtual server. The block foundry application may then create the first block in the chain of blocks that comprises a block number, a nonce, a timestamp, and a hash. In some embodiments, the first block may be referred to as the birth block. Since there is no block preceding the birth block, there may not be a previous hash or the previous hash may be assigned value of 0. As the virtual server operates on the network, the tracking application may detect a change of state on the virtual server. A request may be sent to the plurality of nodes in the network to create another block that records the change of state of the virtual server. The plurality of nodes may operate as a plurality of consensus servers. A change of state of the virtual server may occur when the virtual server processes a predefined number of wireless communication services from a plurality of UEs on the network. For example, a change of state may occur when the virtual server conducts one thousand authentication functions for UEs on the network.

This process may repeat until the virtual server is terminated. Upon termination of the virtual server, the tracking application may be triggered to send a request for an end block, and the nodes in the network may create an end block for the chain of blocks. The blocks link together to form a chain since each block after the birth block comprises a hash and the hash of the previous block that links the blocks and allows the order to be followed back to the birth block. Any modification to a block in the chain of blocks invalidates the hash of that particular block which in turn invalidates the blocks that come after the invalidated block. This allows for a trustworthy method of storing transaction data since the chain of blocks is inherently resistant to alterations in the data.

In an embodiment, each virtual server creates its own chain of blocks to record events (e.g., transactions and/or changes of state). A plurality of chains of blocks may be concurrently generated and stored on the nodes in the network. There may be upwards of tens of thousands of virtual servers operating in a hypervised state at a given time. Each chain of blocks may be in different stages of its life cycle. For example, one chain of blocks may have been created more recently relative to another chain of blocks. Due to the multitude of blocks being created in the network at a given time, the network may assign a priority to a new block request, wherein the priority indicates the distribution of network resources to create the new block by the plurality of nodes in the network. Since the plurality of nodes in the network solve for the hash value of each block and desire consensus, a larger number of block requests may cause the nodes to take a longer amount of time to create new blocks. A higher priority of a new block request would indicate a larger proportion of network resources should be allotted to creating the new block.

It may be desired in some embodiments to group transactions according to a class of user such as by client, function, or some other category. For example, a class of user may be a category of business (e.g., healthcare business, insurance business, technology business) or a specific company. This may further safeguard the data records and prevent clients from accessing other potentially proprietary information within the same network. In some instances, a plurality of parties may desire to access and view the one another's data stored on their chains of blocks. With permission from the network and/or the parties associated with the blocks, the blocks may be released in a read-only state. The virtual computing environment may be executing in a public network, a private network, or a combination thereof.

In an embodiment, it may be desired to combine two or more classes of a chain of blocks or more than one chain of blocks in general. A meta-chain of blocks may provide a secure method for combining multiple chains of blocks into a single chain of blocks in order for the relevant parties to view information of the virtual servers. For example, if a first virtual server is associated with a Company A, a second virtual server is associated with a Company B, and Company A and Company B request to view one another's virtual servers, a meta-chain of blocks may be created. A block of the meta-chain of blocks may comprise a block number, a nonce, a transaction, a hash value, the hash value of the previous block of the meta-chain of blocks, and the hash value of an end block of a chain of blocks.

A new block in the meta-chain of blocks may be requested when a first virtual server is terminated, which thereby terminates a first chain of blocks with an end block. The new block in the meta-chain of blocks may comprise a nonce value, a transaction, a hash value, the hash value of the previous block in the meta-chain of blocks, and the hash value of the end block of the terminated first chain of blocks. In an embodiment, the hash value of the end block of the terminated chain of blocks may be stored in the transaction of the block. When a second virtual server is terminated, another block of the meta-chain of blocks may be created comprising a nonce, a transaction, a hash value, the hash value of the previous block, and the hash value of the end block of the second chain of blocks. As more virtual servers are terminated on the network, more blocks may be created on the meta-chain of blocks, wherein each block comprises the hash value of the end block of the chain of blocks. In an embodiment, a block of the meta-chain of blocks may comprise more than one hash of an end block.

The meta-chain of blocks allows parties on the network a more efficient way of viewing activity of virtual servers on the network. Since a block of the meta-chain of blocks comprises the hash value of the end block of a particular chain of blocks, the hash value of the end block may be used to find the particular chain of blocks and track the history of the virtual server back to the birth block of the particular chain of blocks. The meta-chain of blocks allows parties on the network to view historical information in a trustworthy way since the blocks may not be modified after they are established on the chain. The meta-chain of blocks is described in further detail hereinafter.

In an embodiment, a service provider may desire to bill a user or a plurality of users for network services rendered in the NFV core network. A service provider may determine the network services used by the users from the meta-chain of blocks. A service provider may track the virtual resources used efficiently through the blocks on the meta-chain of blocks associated with a plurality of virtual servers. In another embodiment, a licensor may request an audit that challenges the reported usage of a license associated with the licensor. For example, the license may be related to a licensed entity such as licensed software, licensed logo, licensed design, or licensed intellectual property in which a fee is paid on a per-use basis to the licensor by a licensee. The service provider may comply with the audit request and provide the meta-chain of blocks related to the license to the licensor. Since the meta-chain of blocks and thereby chains of blocks that comprise it are immutable, both the licensor and licensee may trust the information in the blocks as an accurate report regarding the use of the license. Reviewing the appropriate block chain, for example, may promote establishing time durations and numbers of instances of use of the licensed entity.

In an embodiment, a service provider of the network may monitor the usage of the virtual resources in the virtual computing environment. Virtual resources may comprise compute resources, memory resources, I/O resources, and other types of resources. It may be useful for service providers to track virtual resource usage in order to determine when to add or remove hardware assets that support the virtual computing environment. The chain of blocks may track the succession of the changes of states of a virtual server, and service providers may use this information to forecast at some time in the future whether or not hardware assets that support the virtual computing environment should be added or removed. For example, a service provider may determine to increase hardware assets at 5 P.M. on weekdays since mobile communication services increase while people are leaving work. Since the chains of blocks may not be modified without detection by parties in the network, the service provider can be confident of the information it receives about the network.

Turning now to FIG. 1, a system 100 is described. In an embodiment, system 100 comprises a user equipment (UE) 102, an eNodeB (eNB) 104, and a network 106. The UE 102 may be communicatively coupled to the network 106 via a wireless link provided by the enhanced node B (eNB) 104. The UE 102 may further comprise a processor 108, a memory 110, and a cellular transceiver 112. The UE 102 may be a mobile smart phone, a media player, a personal digital assistant (PDA), a laptop computer, a notebook computer, a tablet computer, a wearable computer, or a headset computer. The network 106 may comprise one or more private networks, one or more public networks, or a combination thereof. The network 106 may be a wireless communication network of a wireless communication service provider. In some contexts, the eNB 104 may be referred to as a cell tower or a base transceiver station (BTS). The UE 102 may access the network to obtain a variety of communication services. For example, the UE 102 may establish a voice call on the network 106 via the cellular transceiver 112.

The system 100 further comprises a block server 114, a plurality of consensus servers 116, and a virtual computing environment 118 comprising a physical host 120. The physical host 120 may further comprise a plurality of virtual servers 122 each comprising a virtualized network function (VNF) 124 that comprises a tracking application 126. A VNF 124 may be a common function executing in a virtual server 122 in the virtual computing environment 118. For example, a VNF 124 may be an attach function, an authentication function, a mobility function, a bearer function, a context function, a policy function, or a data function. Other VNFs 124 may be factorized from traditional network functions. A single virtual server 122 may concurrently execute a plurality of instances of a VNF 124. A plurality of virtual servers 122, each executing instances of the same VNF 120 may be deployed to carry a communication load. In an embodiment, a virtual server 122 executes instances of only one VNF 124. For example, no virtual server 122 would concurrently execute instances of different VNFs 124. A hypervisor 128 may be deployed on the physical host 120 to manage the virtual servers 122. Although not shown, the physical host 120 further comprises processors (e.g., microprocessors, digital signal processors, graphics processors), main memory (e.g., disk drives), mass storage, and network interfaces. A single virtual server 122 may execute on one physical host 120 or a plurality of virtual servers 122 may execute on one physical host 120. Any number of physical hosts 120 may exist on the virtual computing environment 118.

The plurality of consensus servers 116 may store a plurality of blocks 140. The plurality of blocks 140 may be linked in a way that forms a chain of blocks 202. The block server 114 comprises a block foundry application 130. The tracking application 126 of the VNF application 124 may be configured to actively monitor the events of the virtual server 122. When the tracking application 126 detects the initiation of a virtual server 122 by the hypervisor 128 on a physical host 120, it may be triggered to send a request to the block foundry application 130 to create a block 140. The block 140 created by the block foundry application 130 may be referred to as a birth block 140 in some contexts since it is the first block of a chain of blocks. The birth block 140 may be transmitted and stored in the plurality of consensus servers 116. Each consensus server 116 stores replicates of the same birth block 140. Consensus servers 116 may be distributed in different geographical locations.

Figure 2:
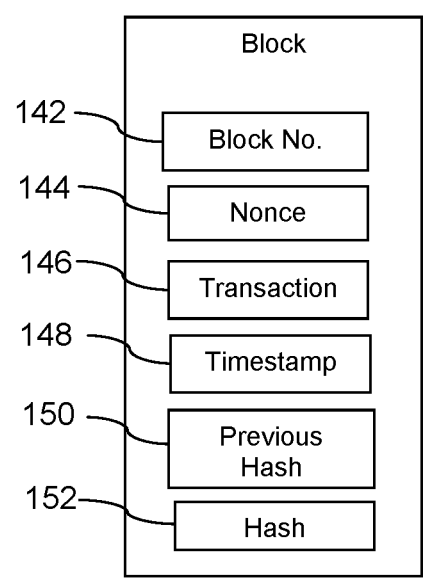
FIG. 2 is a block diagram of a block according to an embodiment of the disclosure.

Turning now to FIG. 2, a block 140 is further described. The block 140 comprises a block number 142, a nonce 144, a transaction 146, a timestamp 148, a previous hash 150, and a hash 152. The previous hash 150 may be the hash 152 of the previous block or most recent block of the chain of blocks 202. The timestamp 148 may be a date and time or an amount of time elapsed from a given moment (e.g., when the birth block is generated). In an embodiment, a block 140 records transactions (e.g., changes of state and/or events) of a virtual server 122 in a permanent and secure manner. A block 140 may record a plurality of transactions 146. The tracking application 126 may identify a change of state of the virtual server 122 and transmit the transaction 146 to the plurality of consensus servers 116. In an embodiment, the tracking application 126 may send transactions 146 after a predetermined number of transactions have occurred. For example, the tracking logic may transmit the transactions to the consensus servers 116 after 5 hundred, 1 thousand, 5 thousand, or any predetermined number of transactions 146 of the virtual server 122. The tracking application 126 may also transmit transactions 146 of a virtual server 122 after a period of time passes (e.g., 1 minute, 10 minutes, 1 hour, or any other period of time).

Each consensus server 116 receives a copy of the transaction 146. Upon receiving the transaction 146, the consensus servers 116 independently create a block by calculating a satisfactory hash 152 based on the block number 142, the nonce 144, data from the transaction 146, the timestamp 148, and the previous hash 150. A hash 152 is calculated by a one-way hashing function from an input data, wherein the same input data returns the same hash 152. Changing as much as a single character of the input data may result in an entirely different hash 152. The hash 152 may be a string comprising a fixed size (e.g., 32-bits, 64-bits, 256-bits). No meaningful data can be derived from the hash 152 about the block 140. In other words, data from the block 140 such as data from the transaction 146 cannot be recovered from the hash 152. There may be a certain condition to fulfill before a hash 152 is deemed satisfactory, such as the hash 152 containing a predetermined number of leading zeros. The nonce 144 is an arbitrary numerical value that may be incrementally varied until the hash 152 satisfies the condition. A consensus server 116 may vary the nonce 144 in order solve the hash 152.

In an embodiment, three or more consensus servers 116 may exist on the network 106. Each consensus server 116 receives a copy of the same transactions 146 and creates a block 140 by calculating a satisfactory hash 152 from varying the nonce 144. The first consensus server 116 to generate a hash 152 that satisfies the condition transmits its block 140 to the other consensus servers 116 for validation. A majority (50%+1 vote) of the consensus servers 116 may confirm the block 140 in order to validate it, where each consensus server 116 receives 1 vote. A copy of the block 140 may be stored in each of the plurality of consensus servers 116. The block number 142 and timestamp 148 may be assigned based on when the block 140 is created relative to other blocks in the chain of blocks 202 that are already stored in the consensus servers 116. The previous hash 150 allows the block 140 to be linked to the most recent block in the consensus server 116. The links between blocks 140 generate a chain of blocks 202, wherein the blocks 140 are in a fixed order. The birth block may not comprise a previous hash 150 or the previous hash 150 may consist of a string of zeros since no block precedes the birth block. Since the hash 152 is based on the block 140, the data of the block 140 may not be modified or altered once the block 140 is validated and stored without invalidating the block 140. The chain of blocks may assure a secure storage of records such as transaction history that may not be altered by a party.

A consensus server 116 may store a plurality of chains of blocks 202. A group of three or more consensus servers 116 each store a copy of the same chains of blocks 202 in order to provide validation for the next block 140. In an embodiment, a greater number of consensus servers 116 may indicate a greater confidence in the accuracy of a validated block 140 since more votes are accounted for. One chain of blocks 202 may record the transactions 146 that occur on one virtual server 122. In an embodiment, a first plurality of consensus servers 116 may store different chains of blocks than a second plurality of consensus servers 116 on the network 106. For example, if ten chains of blocks 202a to 202j record transactions of virtual servers 122a-122j wherein chain of blocks 202a records virtual server 122a, chain of blocks 202b records virtual server 122b and so on and so forth, the first plurality of consensus servers 116 may store chains of blocks 202a-202f, and the second plurality of consensus servers 116 may store chains of blocks 202g-202j. The tracking application 126 of the virtual server 122 may determine to which plurality of consensus servers 116 to distribute the transactions 146. The virtual servers 122a-122j may perform plurality of VNF applications 124. For example, virtual servers 122a-122c may perform an authentication function, virtual servers 122d-122e may perform an attach function, virtual servers 122f-122i may perform a mobility function, and virtual server 122j may perform a context function.

The tracking application 126 may continue to monitor the virtual server 122. When the virtual server 122 is destroyed, the tracking application 126 may send a transaction 146 of the termination of the virtual server 122 to the plurality of consensus servers 116 associated with the chain of blocks 202 of the virtual server 122. The consensus servers 116 may create an end block 140 for the chain of blocks 202, where the end block 140 comprises a block number 142, a nonce 144, the transaction 146, a timestamp 148, a previous hash 150 of the previous block, and a hash 152 based on the transaction 146. After the end block 140 is validated by the plurality of consensus servers, no additional blocks may be inserted or added to the chain of blocks 202 without invalidating the record of the virtual server 122. A party of the network 106 (e.g., a wireless communication service provider) may use the previous hash 150 and hash 152 of the blocks 140 to follow the sequence of changes of state of the virtual server 122 back to the birth block.

In an embodiment, a chain of blocks 202 may comprise confidential or proprietary information (e.g., financial transactions, contracts) or generally information that the parties involved do not wish to be publically available. In the network 106, virtual servers 122 may carry out VNFs 124 for a multitude of separate parties such as different clients, companies, and/or entities. A chain of blocks 202 may be associated with a class. A class may be a client, entity, business category, or some other way of categorizing the chain of blocks 202. These parties may not want other parties in the network 106 to access their transaction record history. To view a chain of blocks 202, a party may use the previous hash 150 and block number 142 where both the previous hash 150 and block number 142 reference the same block 140. As an additional security measure, a party may also assign a chain of blocks 202 with an access credential grants access to a block 140. This way, it would be more difficult for unapproved or nefarious parties to view the transaction history.

In an embodiment, it may be desired to view the chain of blocks 202 as a method for a network service provider to accurately bill a client for services. The service provider may charge clients for network resources used such as the storage and transfer of data. Invoices may be sent on a periodic basis (e.g., every week, every month, every six months, or another period of time). Sometimes, clients may disagree with the amount of network resources used that the service provider presents. At other times, the service provider may incorrectly determine the amount of network resources used. Both the service provider and the client may inspect the chains of blocks 202 to determine the true amount of network resources used. Since the transactions 146 of the chains of blocks 202 may not be modified or deleted without alerting either party, they offer a trustworthy means to verify information.

The chains of blocks 202 may also be used in a multitude of other modes where tracking transaction history is important. For example, a licensing term may exist for the usage of an entity. A client may pay a fee for using the licensed entity (e.g., software, logo, design, intellectual property). The client may be charged the fee on a per-use basis to be paid to the licensor. On a virtual server 122, it may be difficult to accurately track the use of the licensed entity, so a client may under-report the usage which violates the terms of the licensing agreement. On the other hand, a client may also over-report the usage to avoid breaching the licensing agreement, which causes a waste of money for the client. The chains of blocks 202 allow for both the client and licensor to track the usage of the licensed entity as a measure to verify accurate reporting.

Figure 3A:
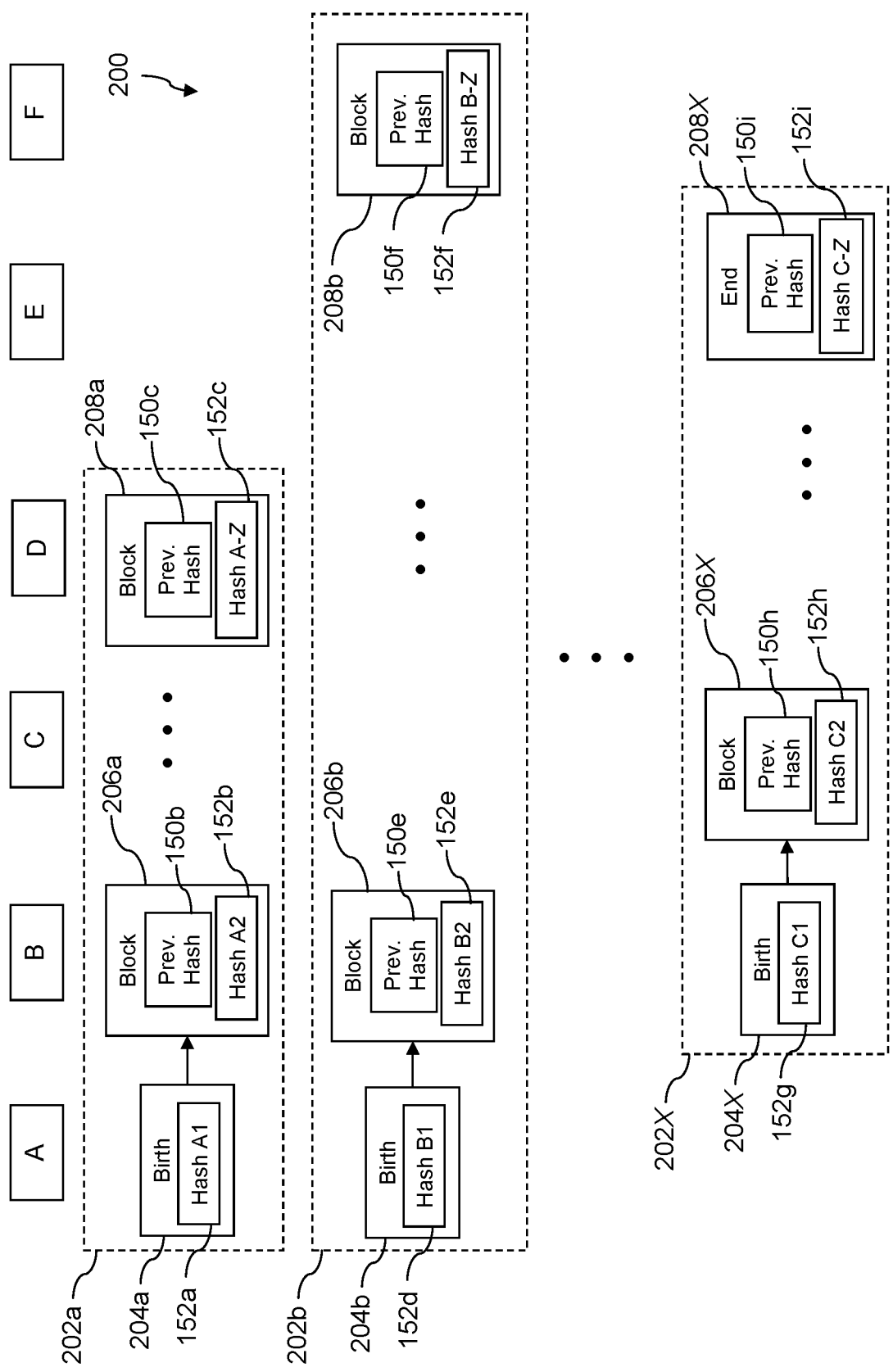
FIGS. 3A and 3B is a block diagram of a communication system according to an embodiment of the disclosure.
Figure 3B:
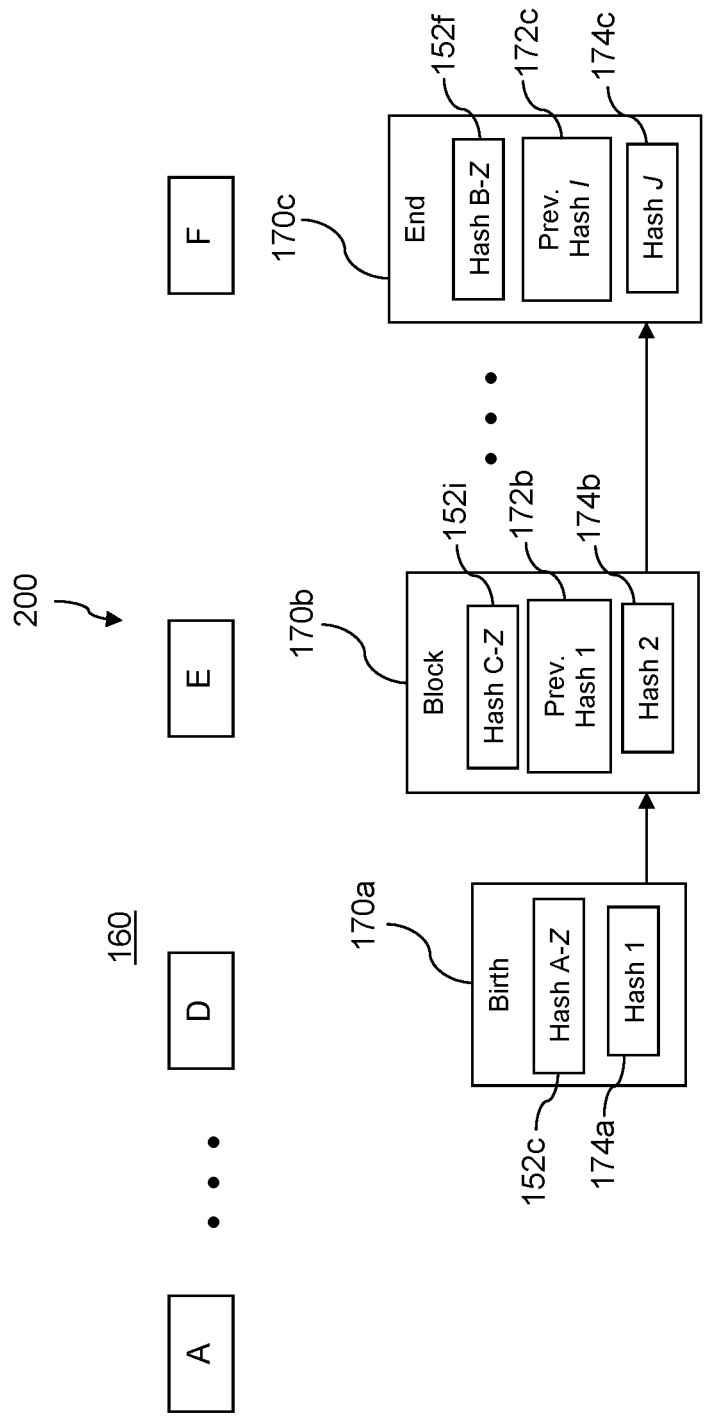

Turning now to FIG. 3A and FIG. 3B, a system 200 is described. The system 200 describes the process of combining a plurality of independent chains of blocks 202 into a meta-chain of blocks 160. In an embodiment, two or more parties in the network 106 may desire to view the transaction history of each other's virtual servers 122. With permission from all the parties involved, the relevant chains of blocks 202 associated with each party may be combined to form another chain of blocks, referred to in this disclosure as a meta-chain of blocks 160. Forming a meta-chain of blocks 160 instead of allowing the parties to freely access the independent chains of blocks 202 themselves allows for an extra layer of security. A party may want certain chains of blocks 202 to remain private. For example, three different companies may work together on a joint project. The meta-chain of blocks 160 may track transactions 146 in real-time as the virtual servers 122 of each of the three companies are destroyed throughout the project. The meta-chain of blocks 160 may provide a quick way for the companies to view the activities of the virtual servers 122.

With reference to FIG. 3A, independent chain of blocks 202*a*, 202*b*, and 202X are shown, where there are X-number of chains of blocks 202. Each of the chains of blocks 202 comprise a birth block 204*a*, 204*b*, 204X, a plurality of blocks 206*a*, 206*b*, 206X, and an end block 208*a*, 208*b*, 208X that are created at time instances A-F. While not shown, it is understood that along with a previous hash 150 and a hash 152, each block 204, 206, 208 comprises a block number 142, a nonce 144, a transaction 146, and a timestamp 148. Each chain of blocks 202*a*, 202*b*, and 202X may be associated with a virtual server 122. For example, the chain of blocks 202*a* may be associated with a first server 122, the chain of blocks 202*b* may be associated with a second virtual server 122, and the chain of blocks 202X may be associated with an X-th virtual server 122X.

At time instance A, the first virtual server 122*a* is initiated on the network 106, and the tracking application 126 of the first virtual server 122*a* may request a birth block 204*a* from the block foundry application 130. The birth block 204*a* of the first chain of blocks 202*a* may be created by the block foundry application 130, where the birth block 204*a* comprises a hash 152*a*. The birth block 204*a* may comprise a previous hash 150*a* (not shown) that comprises a value of zero or a string of zeros. The birth block 204*a* may be transmitted to the plurality of consensus servers 116 to be stored. At the same time instance A, the second virtual server 122*b* may be initiated on the network 106, and the tracking application 126 of the second virtual server 122*b* may request a birth block 204*b* from the block foundry application 130. The birth block 204*b* of the second chain of blocks 202*b* may be created by the block foundry application 130, where the birth block 202*b* comprises a hash 152*d*. The birth block 204*b* may be transmitted to the plurality of consensus servers 116.

At time instance B, the X-th virtual server 122X may be initiated on the network 106, and the tracking application 126 of the X-th virtual server 122X may request a birth block 204X from the block foundry application 130. The birth block 204X of the X-th chain of blocks 202X may be created by the block foundry application 130, where the birth block 204X comprises a hash 152*g*. The birth block 204X may be transmitted to the plurality of consensus servers 116. Furthermore at time instance B, the tracking application 126 of each of the virtual servers 122*a*, 122*b* may request more blocks 206*a*, 206*b* to be created by the plurality of consensus servers 116 for the chains of blocks 202*a*, 202*b*. Each of the blocks 206*a*, 206*b* may comprise a previous hash 150*b*, 150*e* and hash 152*b*, 152*e* as the virtual servers 122*a*, 122*b* undergo changes of state. The tracking application 126 may determine when to request new blocks 206 from the plurality of consensus servers 116.

At time instance C, chain of blocks 202X creates a new block 206X comprising previous hash 150*h* and hash 152*h* in response to a change of state of the virtual server 122X. The tracking application 126 of virtual servers 122*a*, 122*b*, 122X continue to request blocks 206*a*, 206*b*, 206X to be created by the consensus servers 116 for the chains of blocks 202*a*, 202*b*, 202X The chains of blocks 202*a*, 202*b*, 202X may comprise any number of blocks 206, and there may be any number of active chains of blocks 202*a*, 202*b*, 202X at a given time.

At time instance D, the first virtual server 122*a* is destroyed, thereby terminating chain of blocks 202*a*. The tracking application 126 may request an end block from the plurality of consensus servers 116. The plurality of consensus servers 116 may create an end block 208*a* that comprises a previous hash 150*c* and hash 152*c*. In response to the end block 208*a* of the first chain of blocks 202*a*, the tracking application 126 may also request a birth block 170*a* of a meta-chain of blocks 160 from the block foundry application 130. The birth block 170*a* may comprise a hash 174*a* and the hash 152*c* of the end block 208*a* of the first chain of blocks 202*a*. The birth block 170*a* may be transmitted and stored in the plurality of consensus servers 116. Although not shown, the birth block 170*a* may also comprise a block number 142, a nonce 144, a transaction 146, and a timestamp 148. In some embodiments, the hash 152*c* may be stored as a transaction 146 of the birth block 170*a*.

At time instance E, the X-th virtual server 122X is destroyed, thereby terminating chain of blocks 202X, and an end block 208X that comprises a previous hash 150*i* and hash 152*i* may be created by the consensus servers 116. The tracking application 126 of the X-th virtual server 122X may request the plurality of consensus servers 116 to create a block 170*b* of the meta-chain of blocks 160. The block 170*b* comprising a hash 174*b*, a hash 172*b* of the previous birth block 170*a*, and the hash 152*i* of the block 208X may also be created at time instance E. The block 170*b* may follow the birth block 170*a* and be stored in the consensus servers 116. The previous hash 172*b* links the block 170*b* and the birth block 170a. At time instance F, the second virtual server 122b is destroyed, thereby terminating chain of blocks 202b, and an end block 208b that comprises a previous hash 150c and hash 152c may be created and stored in the plurality of consensus servers 116. An end block 170c of the meta-chain of blocks 160 comprising a hash 174c, a hash 172c of the previous block 170b, and the hash 152f of the block 208b may also be created and stored in the plurality of consensus servers 116 at time instance F.

In an embodiment, the meta-chain of blocks 160 may comprise any number of blocks 170. Blocks 170 of the meta-chain of blocks 160 may continue to be requested and created on the network 106 for a plurality of virtual servers 122. While three virtual servers 122a, 122b, 122X were used in this embodiment, any number of virtual servers 122 comprising any number of blocks may be used to create a meta-chain of blocks 160. The meta-chain of blocks 160 may be created when a first virtual server 122a is destroyed on the virtual computing environment 118 and the meta-chain of blocks 160 may be terminated with an end block 170c when the last virtual server 122X of a plurality of virtual servers 122 of the virtual computing environment 118 is destroyed. The plurality of virtual servers 122 may be related to one another. For example, the plurality of virtual servers 122 may be related by function, by client, or by class. Blocks 170 may be created as virtual servers 122 continue to be destroyed. Virtual servers 122 and thereby chains of blocks 202 may be initiated at any time. The meta-chain of blocks 160 may be stored in the plurality of consensus servers 116 on the network 106. Any number of meta-chains of blocks 160 may be concurrently active and stored in the consensus servers 116 at a given time. It is understood that the blocks 170 of the meta-chain of blocks may also comprise a block number 142, a nonce 144, a transaction 146, and a timestamp 148. In some embodiments, the hash 152 of each of the end blocks 208a, 208b, 208X may be stored as a transaction 146 of the blocks 170.

Like the independent chains of blocks 202a, 202b, 202X, the blocks 170 of the meta-chain of blocks 160 comprise previous hashes 172 and hashes 174. The previous hashes 172 allow the blocks 170 to be linked to create a chain that comprises blocks 170 in a chronological order. The blocks 170 also comprise the hash 152 of the end block 208 of a chain of blocks 202. Due to the linkage between the blocks of a chain, the events of the virtual server 122 may be followed back stage-by-stage until the birth block 204 is reached. The meta-chain of blocks 160 may reside in a plurality of consensus servers 116 and may be viewed by approved parties of the network 106. The meta-chain of blocks 160 allows the parties to view information about the relevant virtual servers 122 in a much more efficient and straightforward way than if the chains of blocks were viewed independently. Since the meta-chain of blocks 160 comprises references to hashes 152 of the chains of blocks 202, a party can use the hashes 152 to access more detailed data about a virtual server 122, if desired.

Figure 4A:
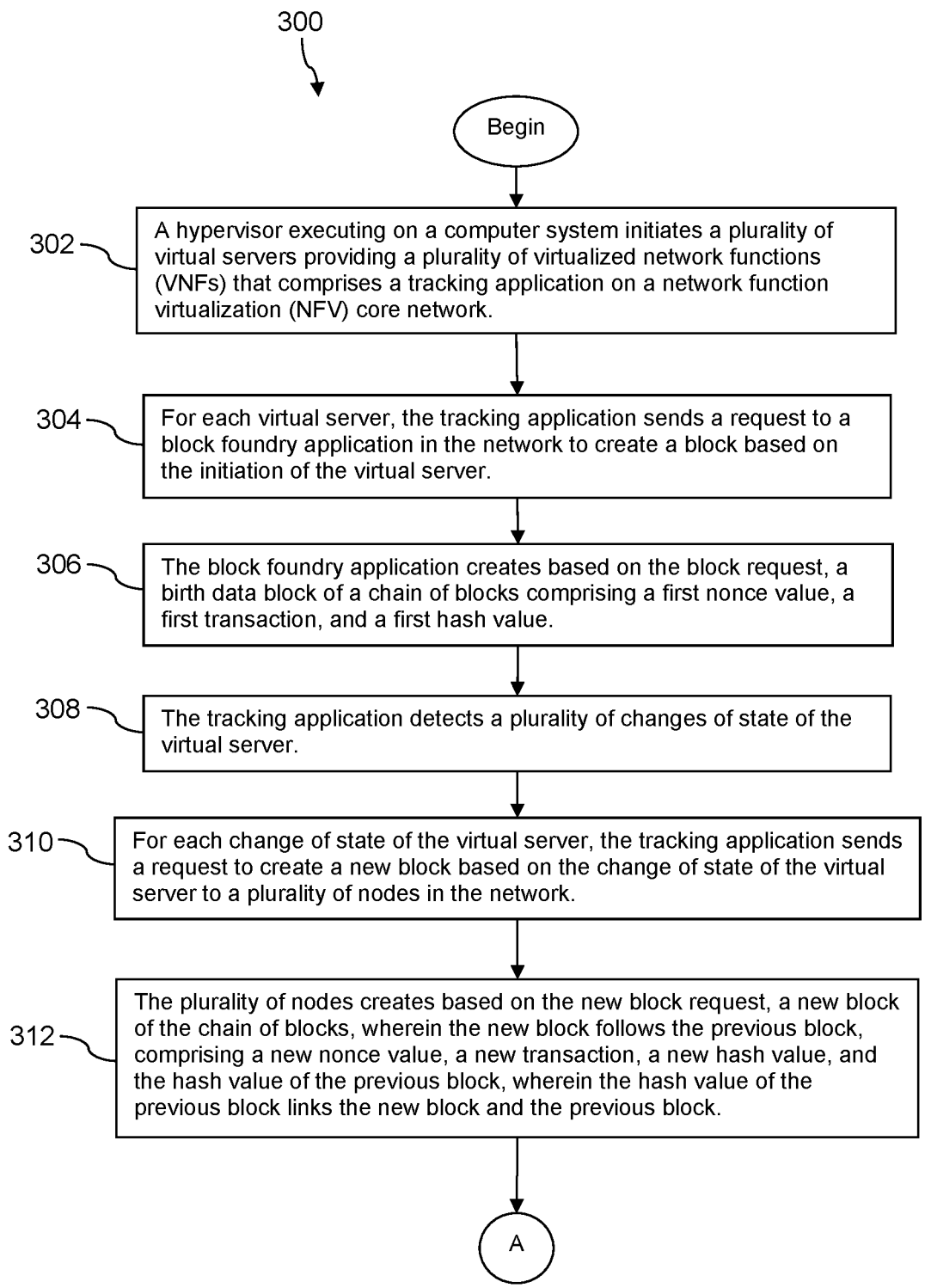
FIGS. 4A and 4B is a flow chart of a method according to an embodiment of the disclosure.
Figure 4B:
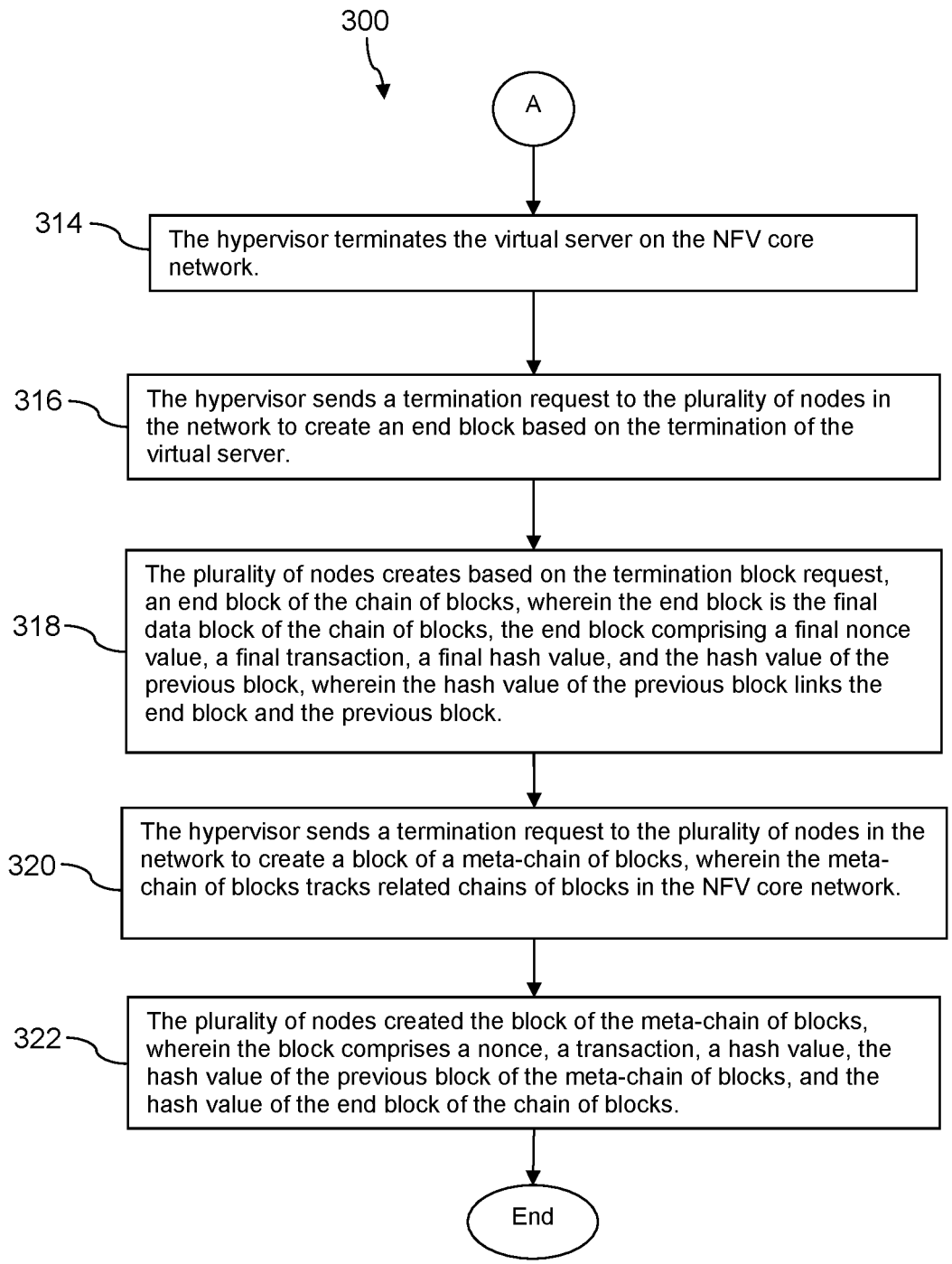

Turning now to FIGS. 4A and 4B, a method 300 is described. At block 302, a hypervisor executing on a computer system initiates a plurality of virtual servers providing a plurality of virtualized network functions (VNFs) that comprises a tracking application on a network function virtualization (NFV) core network. At block 304, for each virtual server, the hypervisor sends a request to a block foundry application in the network to create a block based on the initiation of the virtual server. At block 306, the block foundry application creates based on the block request, a birth data block of a chain of blocks comprising a first nonce value, a first hash value, and a first transaction. At block 308, the tracking application detects a plurality of changes of state of the virtual server.

At block 310, for each change of state of the virtual server, the hypervisor sends a request to create a new block based on the change of state of the virtual server to a plurality of nodes in the network. At block 312, the plurality of nodes creates based on the new block request, a new block of the chain of blocks, wherein the new block follows the previous block, comprising a new nonce value, a new transaction, a new hash value, and the hash value of the previous block, wherein the hash value of the previous block links the new block and the previous block. At block 314, the hypervisor terminates the virtual server on the NFV core network. At block 316, the hypervisor sends a termination request to the plurality of nodes in the network to create an end block based on the termination of the virtual server. At block 318, the plurality of nodes creates based on the termination block request, an end block of the chain of blocks, wherein the end block is the final data block of the chain of blocks, the end block comprising a final nonce value, a final transaction, a final hash value, and the hash value of the previous block, wherein the hash value of the previous block links the end block and the previous block.

At block 320, the hypervisor sends a termination request to the plurality of nodes in the network to create a block of a meta-chain of blocks, wherein the meta-chain of blocks tracks related chains of blocks in the NFV core network. At block 322, the plurality of nodes created the block of the meta-chain of blocks, wherein the block comprises a nonce, a transaction, a hash value, the hash value of the previous block of the meta-chain of blocks, and the hash value of the end block of the chain of blocks.

In an embodiment, method 200 may further comprise billing a user of the virtual server based on usage of the network resources determined from the meta-chain of blocks. Method 200 may further comprise scaling hardware assets used by the NFV core network in response to a change in the frequency of NFV events by a service provider.

Figure 5:
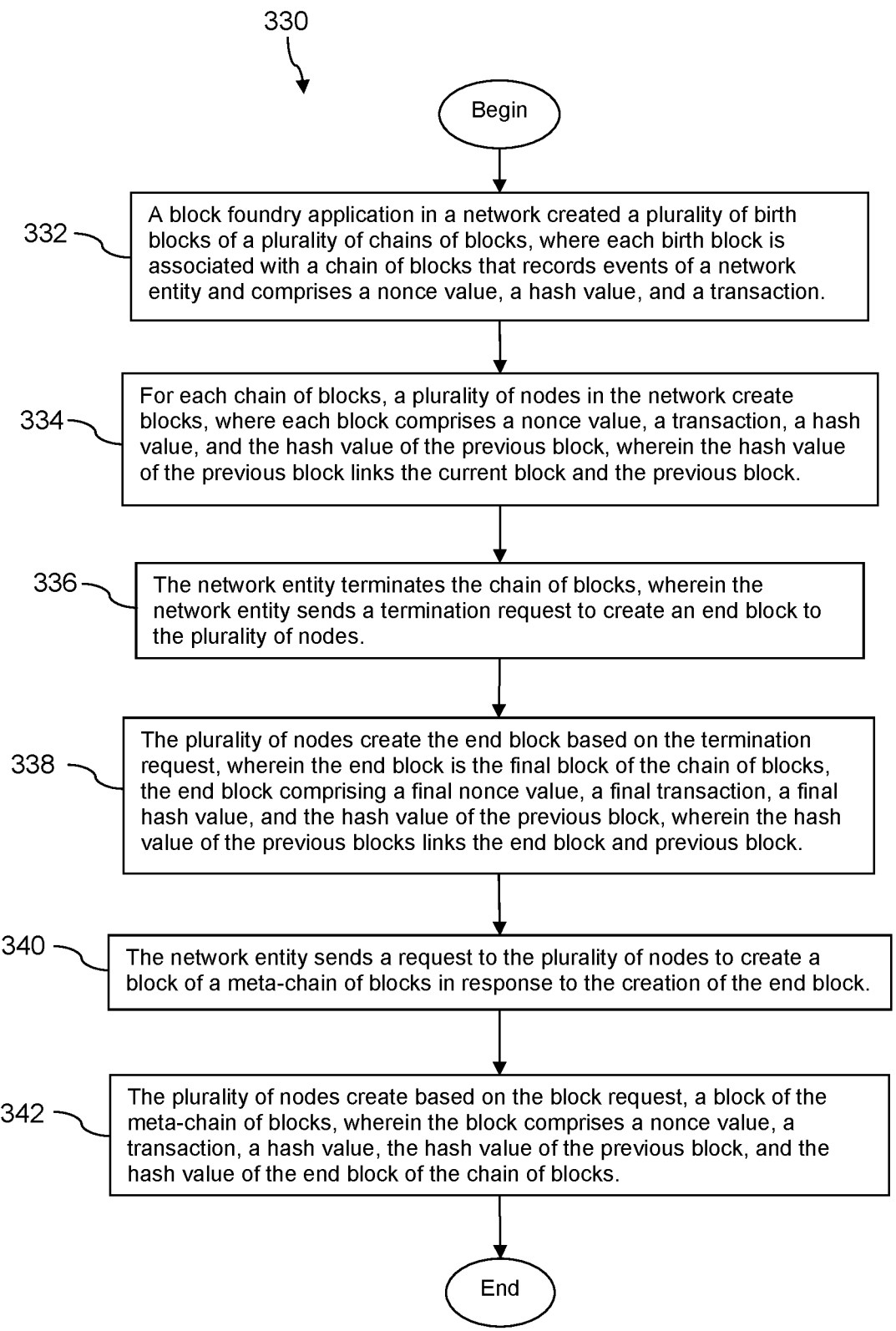
FIG. 5 is a flow chart of another method according to an embodiment of the disclosure.

Turning now to FIG. 5, a method 330 is described. At block 332, a block foundry application in a network created a plurality of birth blocks of a plurality of chains of blocks, where each birth block is associated with a chain of blocks that records events of a network entity and comprises a nonce value, a hash value, and a transaction. At block 334, for each chain of blocks, a plurality of nodes in the network create blocks, where each block comprises a nonce value, a transaction, a hash value, and the hash value of the previous block, wherein the hash value of the previous block links the current block and the previous block. At block 336, the network entity terminates the chain of blocks, wherein the network entity sends a termination request to create an end block to the plurality of nodes.

At block 338, the plurality of nodes create the end block based on the termination request, wherein the end block is the final block of the chain of blocks, the end block comprising a final nonce value, a final transaction, a final hash value, and the hash value of the previous block, wherein the hash value of the previous blocks links the end block and previous block. At block 340, the network entity sends a request to the plurality of nodes to create a block of a meta-chain of blocks in response to the creation of the end block. At block 342, the plurality of nodes create based on the block request, a block of the meta-chain of blocks, wherein the block comprises a nonce value, a transaction, a hash value, the hash value of the previous block, and the hash value of the end block of the chain of blocks.

Method 330 may further comprise receiving an audit request from a licensor by a wireless communication service provider, wherein the audit request challenges the usage amount of at least one license associated with the licensor on the wireless communication network; complying with the audit request by the wireless communication service provider; and verifying, by using the meta-chain of blocks (i.e., scanning, traversing, reading the content and/or data fields thereof), the usage of the at least one license, wherein the usages of the at least one license on a network entity are stored in a block associated with the meta-chain of blocks. Method 330 may further comprise assigning a priority by the network in the block request, wherein the priority is associated with the proportion of computing power distributed by the plurality of nodes to creating the block.

Figure 6:
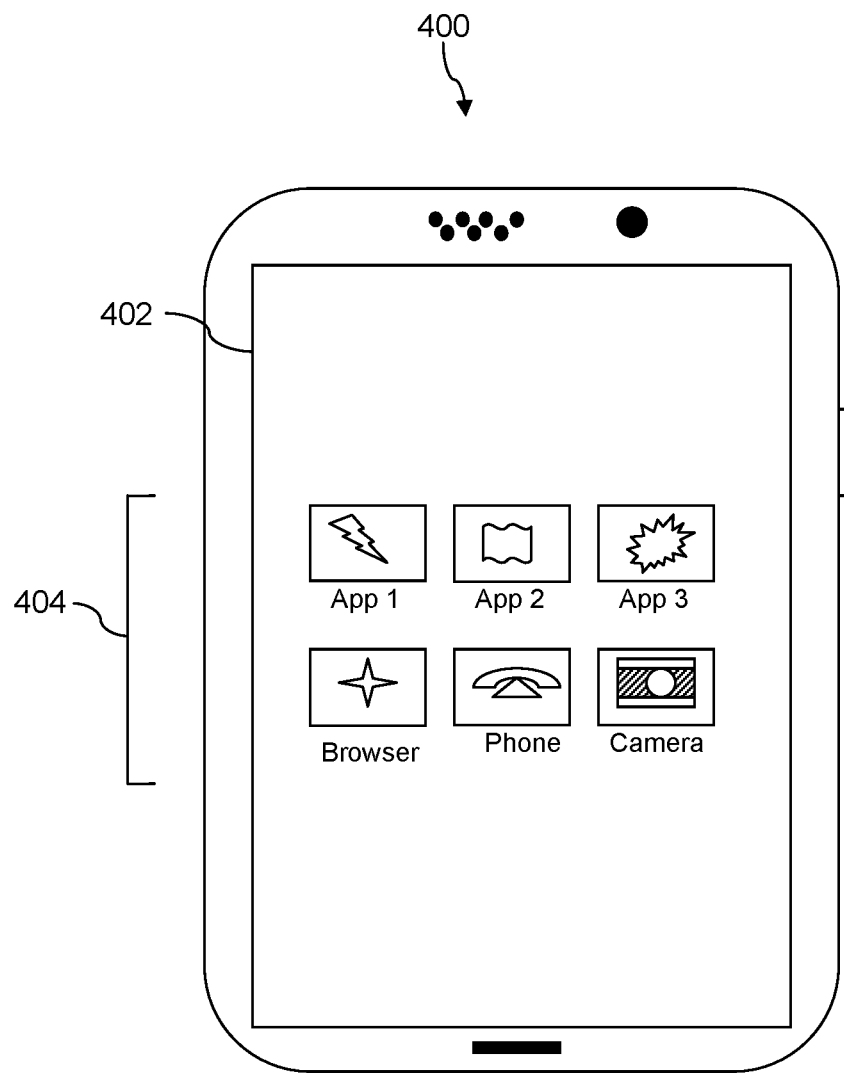
FIG. 6 is an illustration of a user equipment (UE) according to an embodiment of the disclosure.

FIG. 6 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 7:
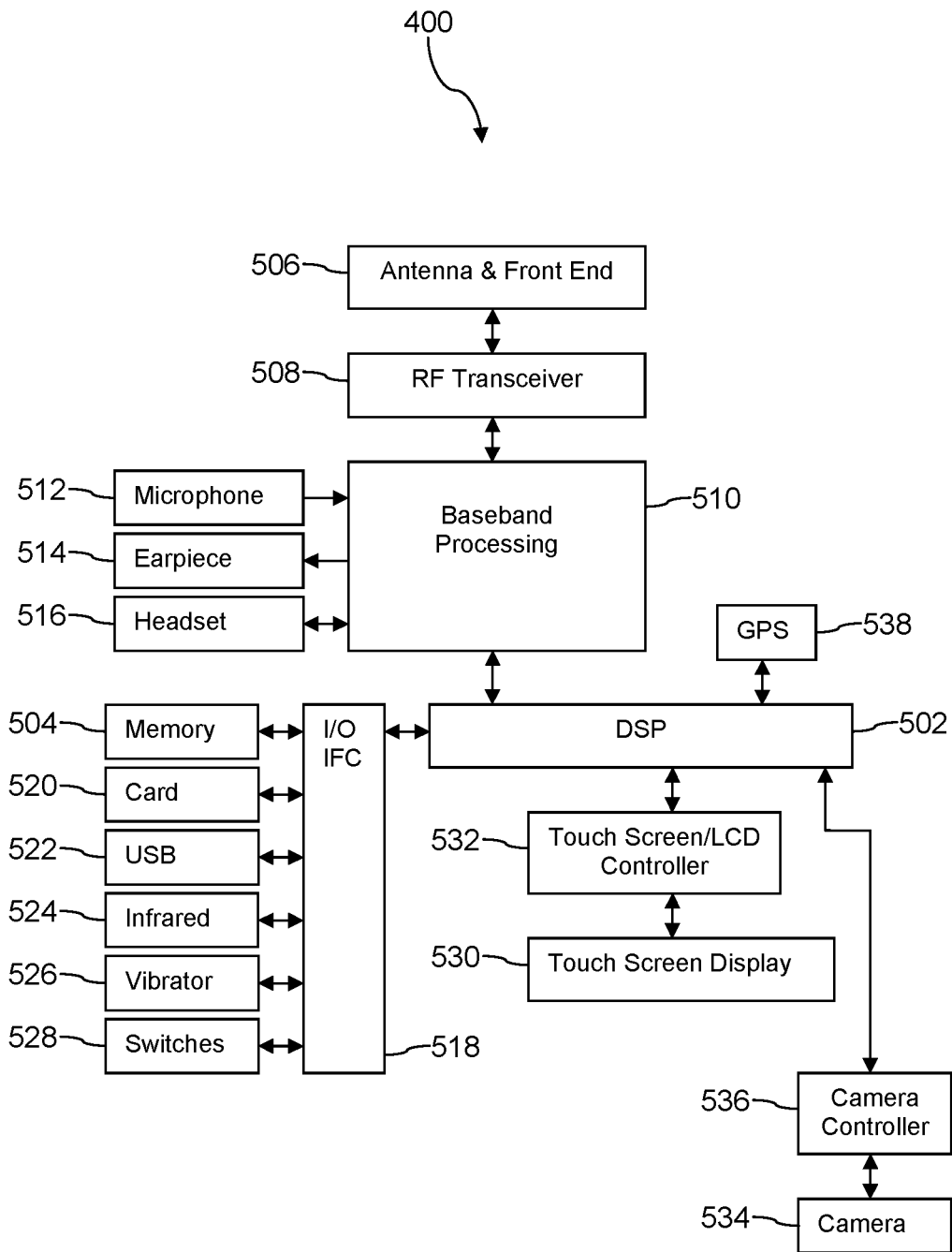
FIG. 7 is a block diagram of a hardware architecture of a UE according to an embodiment of the disclosure.

FIG. 7 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 8A:
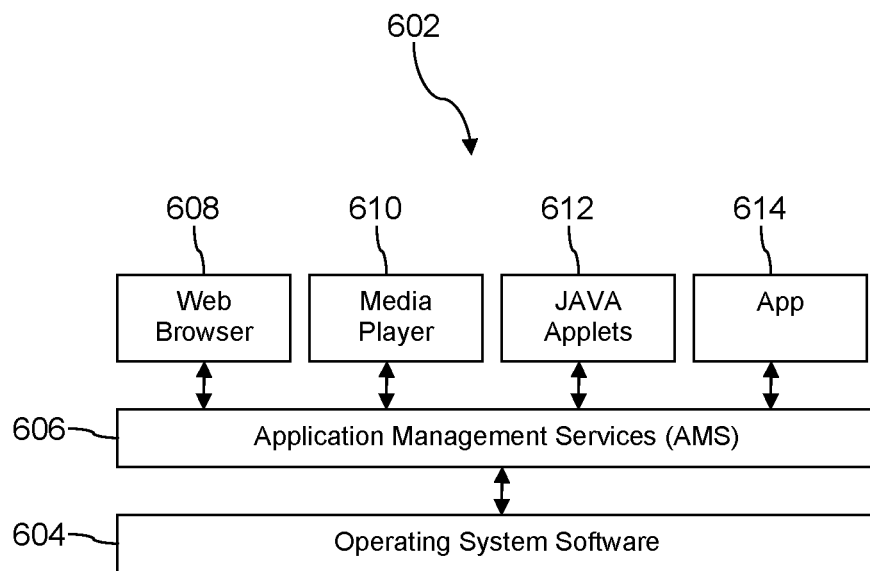
FIG. 8A is a block diagram of a software architecture according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 8A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 8B:
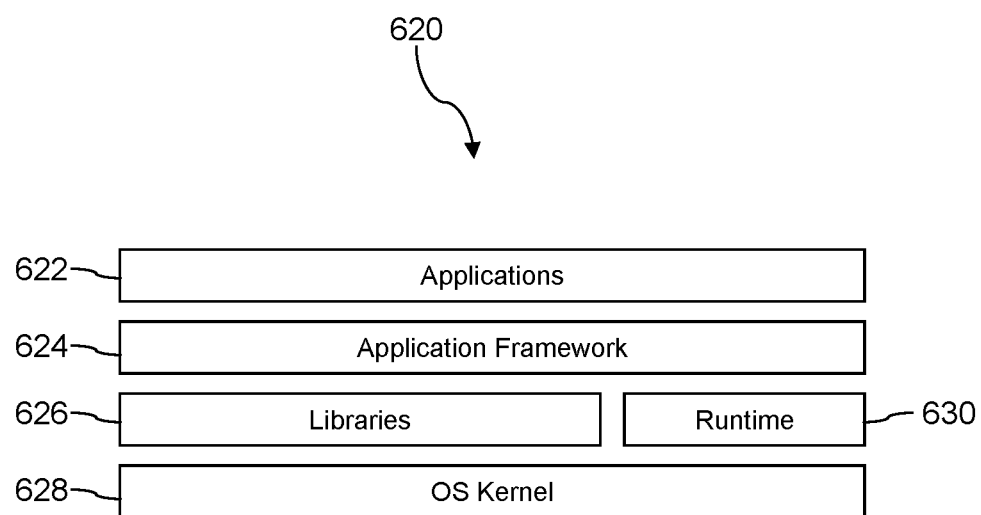
FIG. 8B is a block diagram of another software architecture of a UE according to an embodiment of the disclosure.

FIG. 8B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
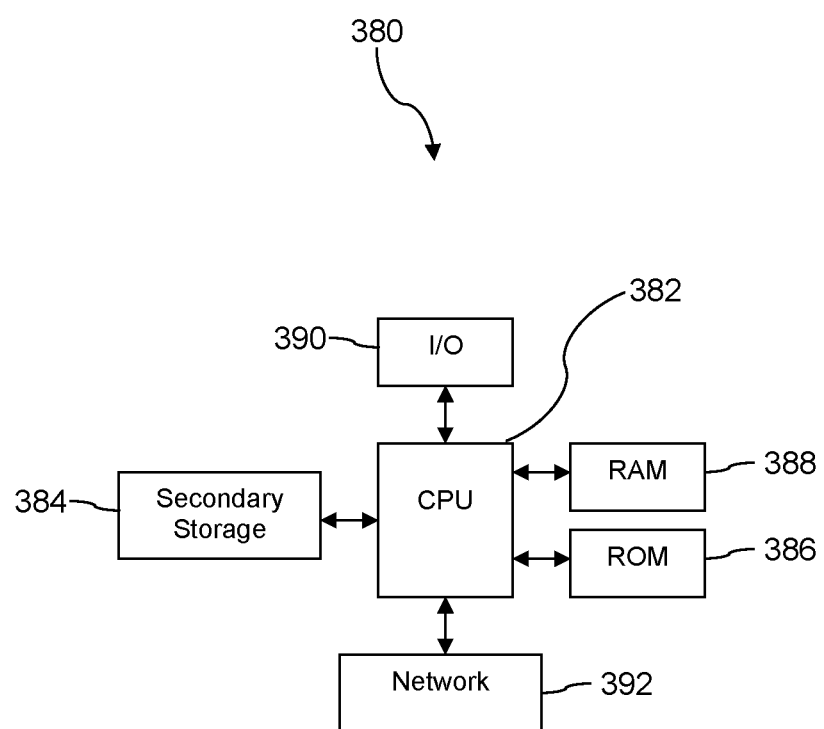
FIG. 9 is a block diagram of a computer system according to an embodiment of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design.

Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of combining chains of blocks in a network, the method comprising:
    creating a plurality of birth blocks of a plurality of chains of blocks by a block foundry application in a network, where each birth block is associated with a chain of blocks that records events of a network entity and comprises a nonce value, a hash value, and a transaction;
    for each chain of blocks,
        creating blocks by a plurality of nodes in the network, where each block comprises a nonce value, a transaction, a hash value, and the hash value of the previous block, wherein the hash value of the previous block links the current block and the previous block;
        terminating the chain of blocks by the network entity, wherein the entity sends a termination request to create an end block to the plurality of nodes;
        creating the end block based on the termination request by the plurality of nodes, wherein the end block is the final block of the chain of blocks, the end block comprising a final nonce value, a final transaction, a final hash value, and the hash value of the previous block, wherein the hash value of the previous block links the end block and previous block;
        in response to the creation of the end block, sending a request by the network entity to the plurality of nodes to create a block of a meta-chain of blocks;
        creating based on the block request the block of the meta-chain of blocks by the plurality of nodes, wherein the block comprises a nonce value, a transaction, a hash value, the hash value of the previous block of the meta-chain of blocks, and the hash value of the end block of the chain of blocks;
        receiving an audit request by a service provider from a user, wherein the audit request challenges a usage amount associated with the user on the wireless communication network;
        complying with the audit request by the service provider; and
        verifying using the meta-chain of blocks the usage of the user, wherein usages are stored in a block associated with the meta-chain of blocks.

2. The method of claim 1, further comprising billing by a service provider a user based on usage of virtualized network functions determined from the meta-chain of blocks.

3. The method of claim 1, further comprising assigning a priority by the network in the block request, wherein the priority is associated with a proportion of computing power distributed by the plurality of nodes to creating the block.

4. The method of claim 1, wherein the network entity is a hypervisor of a virtual server executing on a physical host in a network function virtualization (NFV) core network.

5. The method of claim 4, further comprising scaling a plurality of virtual servers used by the NFV core network in response to a change in a frequency of NFV events by the service provider.

6. The method of claim 4, wherein the virtual server provides a virtualized network function (VNF), and wherein the VNF provides a common function selected from one of a policy function, a mobility function, a bearer function, a context function, an authentication function, an attach function, or a data function.

7. The method of claim 4, wherein the network comprises 3 or more nodes.

8. The method of claim 7, further comprising agreeing by a majority vote, wherein a majority vote is 50% plus one vote, by the plurality of nodes in the network to create a block, where each node receives one vote.

9. The method of claim 8, wherein a copy of a chain of blocks is stored on the plurality of nodes in the network, where each node stores the most recent copy of the chain of blocks.

10. A network system, comprising:
    a block foundry server;
    a plurality of network entities;
    a plurality of nodes in a network, comprising:
        a non-transitory memory;
        a plurality of chains of blocks stored in the non-transitory memory, wherein each chain of blocks comprises a birth block, a plurality of blocks, and an end block, each block comprising a block number, a nonce value, a transaction, a hash value, and the hash value of the previous block, wherein the hash value of the previous block links the block and the previous block; and
        a meta-chain of blocks stored in the non-transitory memory, wherein the meta-chain of blocks comprises at least one block that comprises a block number, a nonce value, a transaction, a hash value, a hash value of the previous block of the meta-chain of blocks, and a hash value of an end block of a chain of blocks; and
    an audit application stored in a non-transitory memory of a server in the network that, when executed,
        receives an audit request associated with a usage history of at least one of the plurality of network entities,
        reads the meta-chain of blocks associated with the at least one network entity,
        determines the usage history of the at least one network entity, and
        sends an audit report of the usage history of the at least one network entity.

11. The network system of claim 10, wherein the chain of blocks records usage history information of at least one of the plurality of network entities.

12. The network system of claim 10, wherein a third party of the network verifies the audit report of the meta-chain of blocks.

13. The network system of claim 10, wherein at least one network entity of the plurality of network entities is a virtual server executing on a physical server of the network that provides a virtualized network function (VNF), and wherein the VNF is a common function selected from one of a policy function, a mobility function, a bearer function, a context function, an authentication function, an attach function, or a data function.

14. The network system of claim 13, wherein a user is billed by a service provider based on usage of virtualized network functions determined from the meta-chain of blocks.

15. The network system of claim 10, wherein the plurality of network entities provide virtualized network functions (VNFs), and wherein the VNFs provide wireless communication services to one of a mobile smart phone, a media player, a personal digital assistant (PDA), a laptop computer, a notebook computer, a table computer, a wearable computer, a headset computer, or a combination thereof.

16. The network system of claim 10, wherein the meta-chain of blocks comprises two or more classes of chains of blocks, and wherein each chain of blocks is associated with a class of transactions.

17. The network system of claim 10, wherein the plurality of nodes create a block of the meta-chain of blocks in response to creation of an end block and in response to receiving a block request from a network entity of the plurality of network entities.

18. The network system of claim 17, wherein the network assigns a priority in the block request, and wherein the priority is associated with a proportion of computing power distributed by the plurality of nodes to creating the block of the meta-chain of blocks.

\* \* \* \* \*